April 30, 1968     J. W. ANGUS     3,381,191
TORQUE AMPLIFIER
Filed March 3, 1965     2 Sheets-Sheet 1
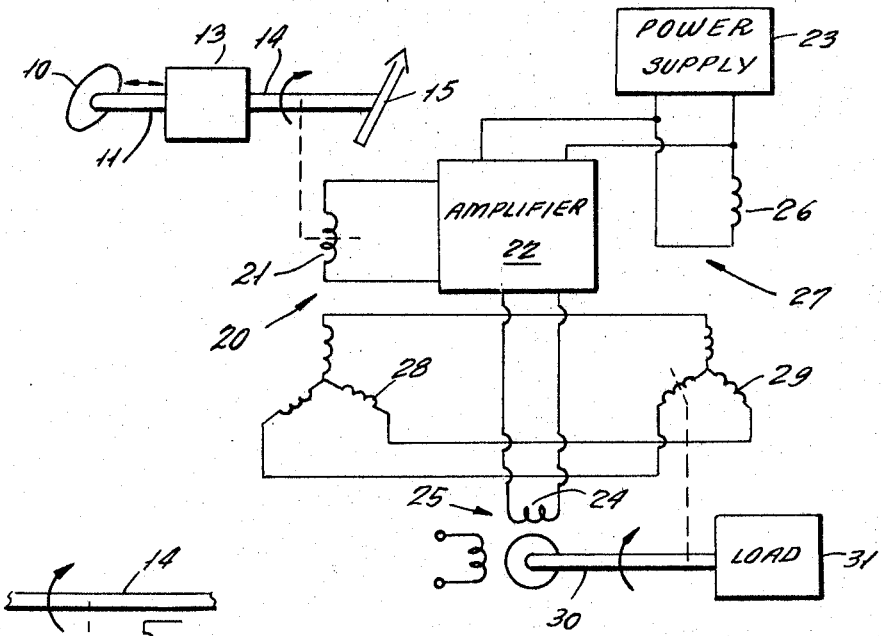
FIG. 1. PRIOR ART
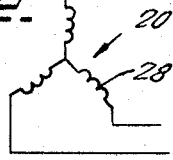
FIG. 2. PRIOR ART
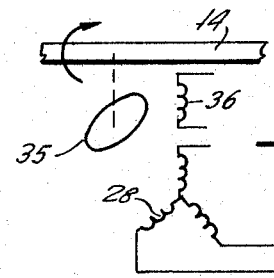
FIG. 3. PRIOR ART
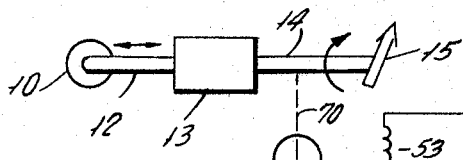
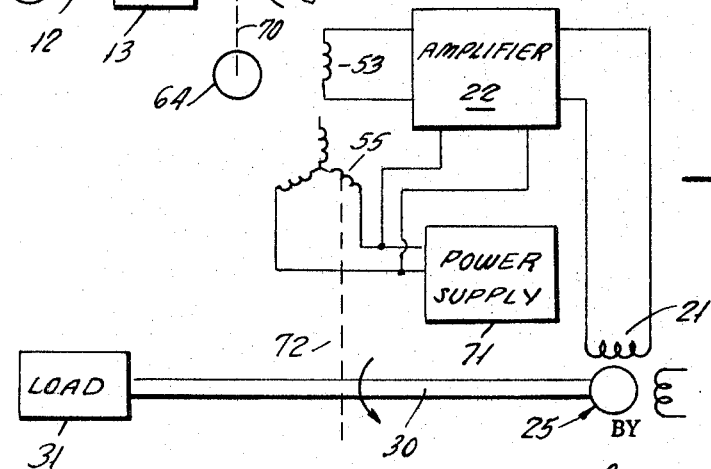
FIG. 6.
INVENTOR.
JAMES W. ANGUS
BY OSTROLENK, FABER, GERB & SOFFEN
ATTORNEYS April 30, 1968  J. W. ANGUS  3,381,191
TORQUE AMPLIFIER
Filed March 3, 1965  2 Sheets-Sheet 2
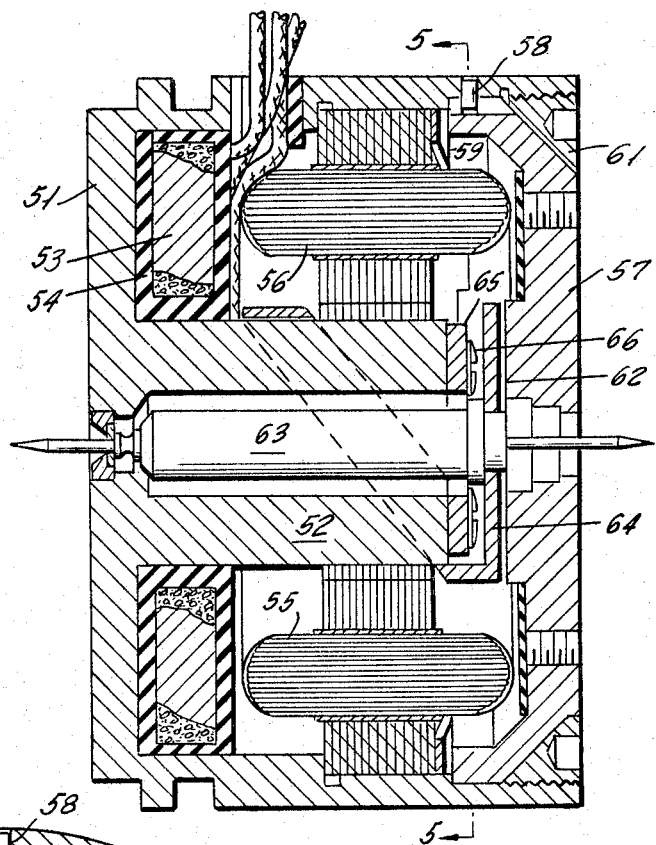
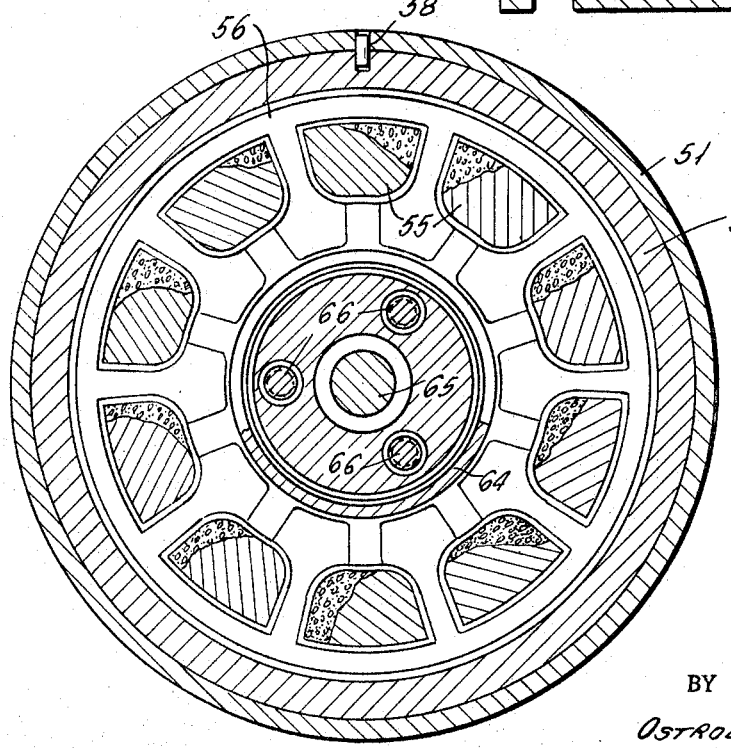
INVENTOR.
JAMES W. ANGUS
BY
OSTROLENK, FABER, GERB & SOFFEN
ATTORNEYS United States Patent Office 3,381,191
Patented Apr. 30, 1968

3,381,191
TORQUE AMPLIFIER
James W. Angus, Chappaqua, N.Y., assignor to Kollsman Instrument Corporation, Elmhurst, N.Y., a corporation of New York
Filed Mar. 3, 1965, Ser. No. 436,894
6 Claims. (Cl. 318—23)

This invention relates to a novel structure for the amplification of torque, and more specifically relates to a novel servo system which measures the relatively small torque of an input shaft and rotates an output shaft with high torque according to the rotation of the input shaft.

Many instruments are in existence which sense physical data and have an output shaft whose position is an accurate indication of this physical data. Generally, however, the torque available from this output shaft is too small to serve any purpose other than to move a direct reading indicator with respect to a dial surface or the rotor of a synchro transmitter in a servo system. Typical devices of this type are altimeters, airspeed indicators, mach meters, and other type devices wherein shaft rotation is derived from pressure diaphragms. Many other instruments are also available which produce mechanical movement at low torque in response to some measured property.

In accordance with the present invention, the rotatable element of a synchro device known as a "Synchrotel" which is a trademark of the Kollsman Instrument Corporation is connected to the output shaft, and is rotated thereby, while the output of the stationary "rotor" of the device drives a conventional servo motor which, in turn, positions a high torque output shaft, and additionally maintains the stator of the Synchrotel in a fixed relationship to the output shaft of the sensing device.

Therefore, the present invention provides a high torque output from a low torque input without degrading the high accuracy of the sensor such as an altimeter device. Moreover, this is accomplished without the addition of the usual servo mechanism system which would include a standard synchro receiver or control transformer driven from the synchro control transmitter comprising the Synchrotel device. By eliminating a complete synchro device the invention, therefore, eliminates the errors due to electrical irregularities of the additional synchro stator and increases the reliability of the system. Moreover, the system is of the fail-safe type when applied to various types of instruments having auxiliary indication means, since a failure in a portion of the system containing the synchro-will not affect the normal operation of the indicator since the coupling device exerts only a slight frictional torque on the delicate indicator or mechanism.

Accordingly, a primary object of this invention is to provide a novel torque amplification structure.

Yet another object of this invention is to provide a novel servo system using only a single synchro device of the Synchrotel type.

Another object of this invention is to provide a fail-safe torque amplifier for delicate indicating instruments which remain operative upon the failure of a torque-amplifying synchro system.

These and other objects of this invention will become apparent from the following description when taken in connection with the drawings, in which:

FIGURE 1 schematically illustrates a prior art type of aircraft instrument and servo system for driving some load such as an aircraft engine throttle setting in accordance with the aircraft indicator setting.

FIGURE 2 shows the schematic illustration of the synchro transmitter of FIGURE 1.

FIGURE 3 is similar to FIGURE 2 and shows the schematic illustration for a Synchrotel-type of synchro transmitter.

FIGURE 4 is a longitudinal sectional view of a Synchrotel-type of synchro transmitter.

FIGURE 5 is a cross-sectional view of FIGURE 4 taken across the line 5—5 in FIGURE 4.

FIGURE 6 schematically illustrates the novel servo system of the invention in combination with a synchro transmitter of the type shown in FIGURES 3, 4 and 5.

Referring first to FIGURE 1, I have illustrated therein a pressure capsule 10 which is a pressure transducer which transduces pressure changes into the axial movements of a shaft 11, as indicated by the arrows 12. The pressure capsule 10 can be arranged in any desired manner so as to operate, for example, in the mode of an altimeter, an airspeed indicator, or any other similar pressure-sensing device.

The shaft 11 is then connected through any suitable motion converter 13 which could include a suitable gear system for converting the longitudinal motion of shaft 11 into the rotational motion of a shaft 14. The shaft 14 may then be connected to a pointer 15 which moves over the dial face of an indicator device which indicates the desired pressure parameters being measured by capsule 10 in terms of airspeed, mach number, altitude, or the like.

There are many applications in which it is desirable to remotely indicate the position of pointer 15 and, thus shaft 14, or to drive other instruments or equipment in accordance with the position of shaft 14. Thus, it is very common to automatically adjust the aircraft engine throttle setting in accordance with the airspeed as determined by the angular position of shaft 14. Alternatively, it may be desired to drive some suitable encoder in accordance with the position of shaft 14 for automatically reporting the parameter measured by the rotation of shaft 14.

To this end, and since the torque available at shaft 15 is extremely low, it has been necessary to provide some suitable servo system which operates to amplify the output torque of shaft 14 and to apply this amplified torque to the auxiliary structure. Thus, it is old and well known, as shown in FIGURE 1, to provide a synchro transmitter 20 which has a rotor 21 which is connected to shaft 14 and rotated thereby. The output terminals of rotor 21 are then connected to some suitable amplifier 22 which has an input from the power supply 23 and a pair of output terminals connected to winding 24 of the servo motor 25.

The power supply 23 is then further connected to the rotor 26 of a standard synchro 27 wherein the stator windings 28 and 29 of synchros 20 and 27 are connected together in the standard manner. The output shaft 30 of motor 25 is then connected to drive a suitable load 31 with this output shaft being further connected to rotate the stator 29 of synchro 27 in order to null the output signal of rotor 21 in the usual manner.

Thus, the prior art servo system of FIGURE 1 will cause the shaft position of shaft 30 to correspond to the shaft position of the input shaft 14 where, however, the available torque from shaft 30 can drive a high torque load 31 which could be an encoder or an aircraft engine throttle setting device. The synchro transmitter 20 of FIGURE 1 is shown in the usual schematic manner, as illustrated in FIGURE 2.

An equivalent device to the synchro transmitter of FIGURE 2 is the Synchrotel-type device schematically illustrated in FIGURE 3. Thus, the device of FIGURE 3 could have been directly used in the diagram of FIGURE 1, wherein the rotatable rotor element 35 rotates to adjust the coupling between the stator winding 28 and the stationary "rotor" 36 wherein the winding 36 is connected identically in the manner of winding 21 of FIGURE 1, while the rotatable element 35 is mechanically connected to shaft 14.

FIGURES 4 and 5 illustrate in detail the manner in which a Synchrotel device may be constructed to produce the schematic circuit of FIGURE 3.

More specifically, the Synchrotel device consists of a cup-shaped outer casing 51 of magnetic material having a hollow central core 52. Within the outer casing 51 and surrounding the central core 52 is provided a stationary "rotor" (in effect) winding 53 suitably insulated from the casing 51 by insulating strips 54, and a stationary multiphase stator winding 55 wound on laminated pole pieces 56. A cover plate 57 keyed at 58 and a spring washer 59 are provided to secure the laminated pole pieces 56 with the stationary stator winding 55 in place within the casing 51. A threaded annular ring 61 is provided to secure the cover plate 57 in place.

Within the hollow portion of the central core 52 and rotatably mounted in both the outer casing 51 and the cover plate 57 is disposed a shaft 63 carrying a skewed rotor 64. Surrounding the shaft and mounted on the end face of the central core 52 is a magnetizable compensator disc 65, which is of magnetizable material, secured by three adjustment screws 66. However, if desired, the entire core 52 may be shifted within small limits to achieve the same correction as obtained by disc 65.

When the stator winding 55 is energized, the magnetic flux produced should flow from stator pole to stator pole transversely only of the core 52. This flux will induce a voltage in the rotor 64 which will be determined by the angular position of the rotor. The current induced in the rotor 64, which is of electrically conductive material, will produce a component of flux longitudinally of the core 52 and about the casing which will link the winding 53 to induce a voltage therein. The voltage induced in winding 53 and the flux threading this winding should be produced solely by the current induced in the rotor 64. Due to mechanical irregularities in the flux path, all of the flux produced by stator winding 55 does not pass transversely of the core 52 but a proportion thereof will pass longitudinally of the core and will link the winding 53 to produce a voltage therein giving rise to an erroneous signal. The compensating disc 65 is provided to be adjusted universally transversely of the core 52 to minimize these irregularities and reduce the axial component of the stator flux.

The adjustment of the compensating disc 65 is as follows:

With the cover plate 57 and the movable rotor 64 removed, and with the stator windings 55 energized from a source of alternating voltage which thereby produces a flux rotating in the device and with the stationary "rotor" windings 53 connected to some form of indicating device, the screws 66 holding the compensating disc 65 are loosened and the disc is moved until by trial and error a position is found where the voltage induced in the stationary "rotor" winding 53 is a minimum. It is understood that with the device energized, as described, the voltage induced in the winding 53 will be due only to flux from the stator energization which flows axially through the core 52 and that when the disc 65 is adjusted to reduce the indication of the indicating device attached to the windings 53 to a minimum, it is thereby reducing the amount of flux from the stator winding 55 flowing axially within the central core 52. This correction both minimizes the residual or null voltages in the device and increases the angular accuracy of the rotor position. The device will, of course, be reassembled after adjustment before use.

While the device herein has been referred to in the specification and appended claims as a synchro or a rotary electrical transmitter, it will be understood the invention is applicable generally to, and that these terms are to be construed to cover, control transformers, inductive pickoffs, receivers, signal generators, and similar devices.

FIGURE 6 illustrates the manner in which the Synchrotel device can be added to a light torque input shaft in accordance with the present invention wherein a high torque output shaft is provided which rotates in correspondence with the rotation of the input shaft.

Referring now to FIGURE 6, there is repeated therein the schematically illustrated aircraft instrument of FIGURE 1 which has the rotating pointer shaft 14. In accordance with the invention, the rotor 64 of FIGURES 4 and 5 is secured directly to shaft 14, as illustrated by the dotted line 70, so that the output of pointer shaft 14 of FIGURES 6 is the equivalent of shaft 63 of FIGURES 4 and 5. Thus, the only additional burden added to the pointer shaft 14 is that of the delicate substantially torque-free rotor 64, whereupon the rotation of shaft 14 is substantially unaffected by the addition of the servo system thereto.

The output of the stationary "rotor" winding 53 is then directly connected to the amplifier 22 whose output windings are connected to the winding 24 of the servo motor 25 in a manner similar to that shown in FIGURE 1.

A power supply 71 is then provided to provide power for the stator winding 55 of the Synchrotel.

In accordance with invention, the complete stator is then directly rotated by the output shaft 30 of motor 25 (which is connected to the load 31), as indicated by the dotted line 72. More particularly, and in accordance with the invention, the complete housing of the Synchrotel, shown in FIGURES 4 and 5 may be carried in a suitable bearing so that the complete housing can be rotated by the shaft 30. Therefore, the stator winding 55 will be rotated with respect to shaft 53 in such a manner as to maintain a fixed relationship between the shaft 14 carrying rotor 64 and the stator 55. A high torque output is then available from the output shaft 30 in response to rotation of the input shaft 14 without degrading the high accuracy performance of the sensor 10.

It should be further noted that if the servo system were to fail in any manner, the indicator would still junction properly in the high accuracy positioning of pointer 15 by virtue of the very slight frictional torque exerted by the coupling device 64 back to the delicate mechanism driving the shaft 14.

It will be apparent that the system of the invention can be used for generating signals to remote indication or utilization equipment. That is to say, and with reference to FIGURE 6, amplifier 22, power supply 71, motor 25 and load 31 may be remotely positioned from the indicating instrument.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A servo system comprising a relatively low torque rotatable input shaft, a relatively high torque output shaft, a synchro device comprising a stator winding and a rotor winding means, a servo motor having an input winding, a power supply and a servo amplifier having input and output terminals; said rotatable input shaft connected to said rotor winding means; said power supply connected to said stator winding; said rotor winding means connected to said input terminals of said amplifier; said input winding of said servo motor connected to said output terminals of said amplifier said motor mechanically connected to said stator winding to rotate said stator winding to null the signal generated by said rotor winding means responsive to rotation of said input shaft; said motor mechanically connected to said output shaft to rotate said output shaft responsive to rotation of said input shaft.

2. The servo system of claim 1 wherein said stator winding is a three-phase winding connected in Y; said power supply comprising a three-phase A-C source having respective phases connected to respective phases of said stator winding.

3. A torque amplifier for a pressure capsule driven shaft which includes pressure capsule means extensible responsive to a pressure differential across the walls of said capsule; a rotatable shaft and mechanical linkage means connecting said rotatable shaft to said pressure capsule means whereby expansion and contraction of said pressure capsule rotates said rotatable shaft in a first and second direction respectively with relatively low torque, and a servo system which includes said rotatable shaft as a relatively low torque rotatable input shaft, a relatively high torque output shaft, a synchro device comprising a stator winding and a rotor winding means, a servo motor having an input winding, a power supply and a servo amplifier having input and output terminals; said rotatable input shaft connected to said rotor winding means; said power supply connected to said stator winding; said rotor winding means connected to said input terminals of said amplifier; said input winding of said servo motor connected to said output terminals of said amplifier, said motor mechanically connected to said stator winding to rotate said stator winding to null the signal generated by said rotor winding means responsive to rotation of said input shaft; said motor mechanically connected to said output shaft to rotate said output shaft responsive to rotation of said input shaft.

4. The device substantially as set forth in claim 3 wherein said input shaft includes a rotatable pointer secured to one end thereof.

5. The device substantially as set forth in claim 1 wherein said rotor winding means includes a stationary winding and a rotatable conductive member tilted at an angle less than 90° to the axis of rotation thereof interposed between said stator winding and said stationary winding and adjusting the coupling of said stator winding to said stationary winding in accordance with the angular position of said rotatable conducting member whereby said stationary winding develops outputs substantially similar to the outputs of the rotor of a conventional synchro transmitter; said stationary winding connected to said input terminals of said amplifier.

6. The device substantially as set forth in claim 3 wherein said rotor winding means includes a stationary winding and a rotatable conductive member tilted at an angle less than 90° to the axis of rotation thereof interposed between said stator winding and said stationary winding and adjusting the coupling of said stator winding to said stationary winding in accordance with the angular position of said rotatable conducting member whereby said stationary winding develops outputs substantially similar to the outputs of the rotor of a conventional synchro transmitter; said stationary winding connected to said input terminals of said amplifier.

References Cited
UNITED STATES PATENTS

| | | | |
|---|---|---|---|
| 2,420,160 | 5/1947 | Adamson | 318—23 |
| 2,869,367 | 1/1959 | Moore | 318—28 XR |
| 2,963,224 | 12/1960 | McDonough | 318—28 XR |

BENJAMIN DOBECK, *Primary Examiner.*